United States Patent [19]

Komuro

[11] Patent Number: 4,889,587

[45] Date of Patent: Dec. 26, 1989

[54] METHOD OF PREPARING A SUBSTRATE FOR INK JET HEAD AND METHOD OF PREPARING AN INK JET HEAD

[75] Inventor: Hirokazu Komuro, Hiratsuka, Japan

[73] Assignee: Canon Kabushiki Kaisha, Tokyo, Japan

[21] Appl. No.: 279,086

[22] Filed: Dec. 2, 1988

[30] Foreign Application Priority Data

Dec. 2, 1987 [JP] Japan ................................ 62-303263

[51] Int. Cl.⁴ ........................ B44C 1/22; C03C 15/00; C03C 25/06; C23F 1/02

[52] U.S. Cl. .................................... 156/643; 156/633; 156/634; 156/646; 156/655; 156/656; 156/659.1; 204/192.32; 252/79.1; 346/140 R

[58] Field of Search ............... 156/643, 629, 646, 633, 156/655, 634, 656, 659.1, 665; 252/79.1; 204/192.32, 192.35; 346/1.1, 140 R; 338/308, 314; 219/543

[56] References Cited

U.S. PATENT DOCUMENTS

| | | | |
|---|---|---|---|
| 4,602,261 | 7/1986 | Matsuda et al. | 346/140 R |
| 4,719,478 | 1/1988 | Tachihara et al. | 346/140 R |
| 4,720,716 | 1/1988 | Ikeda et al. | 346/140 R |
| 4,723,129 | 2/1988 | Endo et al. | 346/140 R |
| 4,783,369 | 11/1988 | Sugata et al. | 428/408 |

FOREIGN PATENT DOCUMENTS

| | | |
|---|---|---|
| 2843064 | 4/1979 | Fed. Rep. of Germany . |
| 59936 | 5/1979 | Japan . |
| 194859 | 5/1984 | Japan . |

*Primary Examiner*—William A. Powell
*Attorney, Agent, or Firm*—Fitzpatrick, Cella, Harper & Scinto

[57] ABSTRACT

A method of preparing an ink jet head comprises a support, an electrothermal transducer formed on said support and having a heat-generating resistor and a pair of electrodes connected electrically to said heat-generating resistor, and a liquid path formed on said support corresponding to the heat-generating portion of said electrothermal transducer formed between said pair of electrodes, and communicating with a discharge opening for discharging liquid, which comprises the step of dry etching to pattern the material for said heat-generating resistor provided on said support in the form of a layer.

34 Claims, 3 Drawing Sheets

METHOD OF PREPARING A SUBSTRATE FOR INK JET HEAD AND METHOD OF PREPARING AN INK JET HEAD

BACKGROUND OF THE INVENTION

1. Field of the Invention

This invention relates to a method of preparing a recording head to be used in an ink jet recording device which performs recording by forming droplets of ink by discharging ink and attaching the droplets onto a recording medium such as paper, etc., and to a method of preparing a substrate for constituting the head.

2. Related Background Art

The ink jet recording method is a recording method which performs recording by discharging ink (recording liquid) from a discharge opening provided at an ink jet recording head and attaching the ink onto a recording medium such as paper, etc. This method has many advantages. It generates little noise, is capable of high speed recording, and yet recording can be practiced on plain paper, etc., without use of a special recording paper. Various types of recording heads have been developed.

Among them, the recording head of the type which discharges ink from a discharge opening by utilizing heat energy as disclosed in Japanese Laid-open Patent Publication No. 54-59936 (corresponding to U.S. Pat. No. 4,723,129) and German Laid-open Patent Publication (DOLS) No. 2843064 has such advantages as good response to recording signals, easy multi-formation of discharge openings, etc.

Principal structure of a recording head of the type utilizing heat energy as the ink discharging energy are exemplarily shown in FIGS. 1A and 1B.

The recording head has a structure formed by bonding a substrate comprising an electrothermal transducer as heat generating means provided for converting electrical energy to heat energy to be utilized for ink discharge, arranged on a surface of a support 1 exhibiting insulating properties, and further, if necessary, an upper layer 4 as the protective layer is provided at least on the heat-generating resistor 2 and electrodes 3 positioned below a liquid path 6 and a liquid chamber 10 having an ink supply opening 9. Covering member 5 having a recession for the liquid path 6 and the liquid chamber 10, etc. formed thereon.

The discharging energy for ink discharge in this recording head is imparted by the electrothermal transducer having a pair of electrodes 3 and a heat-generating resistor 2 connected electrically to these electrodes. That is, when current is applied on the electrodes 3 to generate heat from the heat generating portion 8 of the heat-generating resistor 2, the ink in the liquid path 6 near the heat-generating portion 8 is momentarily heated to generate bubbles thereat, and through volume change by momentary volume expansion and shrinkage by generation of the bubbles, ink is discharged as a droplet from a discharge opening.

As the representative method for preparing the electrothermal transducer of the substrate in such constitution of the recording head as described above, there has been known the method as disclosed in Japanese Laid-open Patent Publication No. 59-194859 according to the steps, in which at first a heat-generating resistor layer comprising $HfB_2$, etc. and an electrode layer comprising Al, etc. are successively laminated on an appropriate support. Next the electrode layer is etched to a predetermined shape by use of an etchant, and then the heat-generating resistor layer is further etched to a predetermined shape with the use of an etchant.

Whereas, according to such method, during etching of the heat-generating resistor layer, the etchant will attack the side face of the electrode layer already subjected to patterning, whereby curling or defect will sometimes occur on the side surface of the electrode layer. Also, as shown in FIG. 2, if the heat-generating resistor layer 2 is overetched so that the side surface of the electrode layer 3 is exposed, when a protective layer 4 is further provided, its coverage capacity will become extremely poor, giving rise to defective results such as dissolution of the electrodes by penetration of ink when assembled in the recording head.

As the means for solving such problems, for example, there is the method of subjecting the width of the electrode layer 3 to patterning smaller than the width of the heat-generating resistor layer 2 as shown in FIG. 3.

However, such method is not necessarily satisfactory in practical application or in the point of its effect.

More specifically, during patterning of the heat-generating resistor layer 2 and after patterning of the electrode layer 3, it is necessary to provide a resist mask for patterning by registration with good precision on the electrode pattern 3. Particularly, when higher densification is effected by making smaller the arrangement pitch of the heat-generating portion 8 of the heat-generating resistor 2, the difference in width (W) between the electrode layer 3 and the heat-generating resistor layer 2 must be formed on the order of, for example, 1 μm or less, and registration of the resist mask with good precision in such case is technically difficult, whereby generation of defective registration will often occur resulting in lowering of yield.

Also, since patterning of the heat-generating resistor layer is effected in the wet step by use of an etchant, defective patterning of the heat-generating resistor layer due to the peeling of the etching resist or the battery reaction between the heat-generating resistor layer and the electrode layer will sometimes be generated.

SUMMARY OF THE INVENTION

The present invention has been accomplished in view of the aforementioned problems in the prior art, and its object is to provide a method which can prepare an electrothermal transducer with good precision and good yield, and yet can prepare a substrate for an ink jet recording head and a head having the substrate of good quality.

Another object of the present invention is to provide a method of preparing an ink jet head comprising a support, an electrothermal transducer formed on said support and having a heat-generating resistor and a pair of electrodes connected electrically to said heat-generating resistor and a liquid path formed on said support corresponding to the heat generating portion of said electrothermal transducer formed between said pair of electrodes, and communicating with a discharge opening for discharging liquid, which comprises the step of dry etching to pattern the material for said heat-generating resistor provided on said support in the form of a layer.

Still another object of the present invention is to provide a method of preparing a substrate for an ink jet head comprising a support and an electrothermal transducer formed on said support and having a heat-generating resistor and a pair of electrodes connected electrically to said heat-generating resistor, which comprises the step of dry etching to pattern the material for said heat-generating resistor provided on said support in the form of a layer.

Thus, according to the present invention, since the dry etching method which can easily control the state of etching is used for patterning of the heat-generating resistor layer, etching of the electrode layer and the heat-generating resistor layer can be effected with the same resist pattern, whereby no registration working of the mask, as in the prior art, is required and also there occurs no such problem as described above involved in the wet step because it is the dry step.

Particularly, in the dry etching method, strength of etching or its speed can be easily controlled, and over-etching of the heat-generating resistor or side etching of the electrode can be easily prevented or reduced.

DESCRIPTION OF THE PREFERRED EMBODIMENTS

Figure 1A:
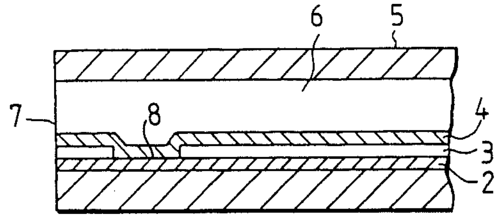
FIGS. 1A and 1B are schematic illustrations showing an example of the principal structure of the ink jet recording head, FIG. 1A showing a partial sectional view of the substrate constituting the recording head, and FIG. 1B an exploded view showing the positional relationship between the substrate and the covering member.

In the following, an embodiment of the method of the present invention is described by referring to the drawings.

Figure 4A:
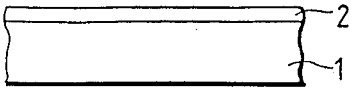
FIGS. 4A–4F are process diagrams showing the principal steps in the method of the present invention as schematic sectional views of the substrate.
Figure 4B:
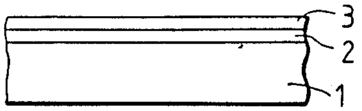

First, as shown in FIGS. 4A and 4B, a heat-generating resistor layer 2 comprising $HfB_2$, etc. and an electrode layer 3 comprising Al, etc. are successively laminated on a support 1 as conventionally practiced.

Figure 4C:
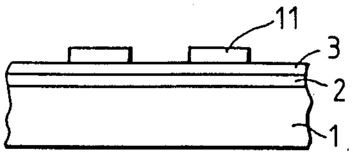

Next, an etching resist 11 is provided as shown in FIG. 4C.

As the etching resist, one comprising a material which is effective for both etching of the electrode layer and dry etching of the heat-generating resistor layer is suitable because these can be etched with the same resist.

As the material for formation of resist, for example, OFPR 800 (Tokyo Oka), AZ 130 (Hoechst), microposit 1400 (Shipley), etc. may be included, and it may be provided to a predetermined shape on the electrode layer 3 according to the patterning method by use of photolithographic steps, etc.

Figure 4D:
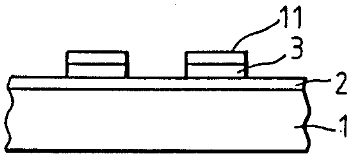

After the etching resist 11 is thus provided, first the electrode layer 3 is etched as shown in FIG. 4D. The etching may be also effected by the wet step by use of an etchant, provided that etching with good precision is possible, which may be suitably selected depending on the material for forming the electrode layer. As the material for formation of the electrode layer, a material which is not attacked by subsequent dry etching of the heat-generating resistor layer is preferred.

Figure 4E:
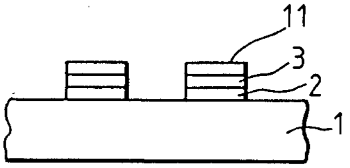

On completion of etching of the electrode layer 3, the heat-generating resistor layer 2 is subjected to dry etching as shown in FIG. 4E.

The operating conditions of dry etching in this case may be suitably selected depending on these materials so that no damage is done to the electrode layer and the heat-generating resistor layer may be formed with good precision and without over-etching or with as little over-etching as possible.

For example, when a boride of such a metal as hafnium, lanthanum, zirconium, titanium, tantalum, tungsten, molybdenum, niobium, chromium, vanadium, etc. is used, halogenic gases including, for example, chlorine-type gases such as $Cl_2$, $BCl_3$, $CCl_4$, $SiCl_4$, etc. and fluorine-type gases such as $CF_4$, $CHF_3$, $C_2F_6$, $NF_3$, etc. are preferable as an etching gas.

Figure 4F:
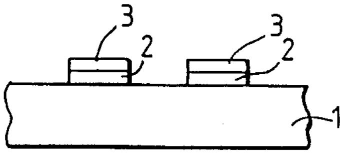

After the electrode layer 3 and the heat-generating resistor layer 2 are thus patterned to desired shapes, the resist 11 is removed from the support 1 as shown in FIG. 4F, and further the predetermined portion of the heat-generating resistor layer is exposed according to the etching step of the electrode layer by use of photolithographic steps to form a heat-generating portion of heat-generating resistor, thus providing an electrothermal transducer on the support. Further, if desired, a protective film comprising $SiO_2$, polyimide, etc. is provided to form a substrate for an ink jet recording head.

Figure 1B:
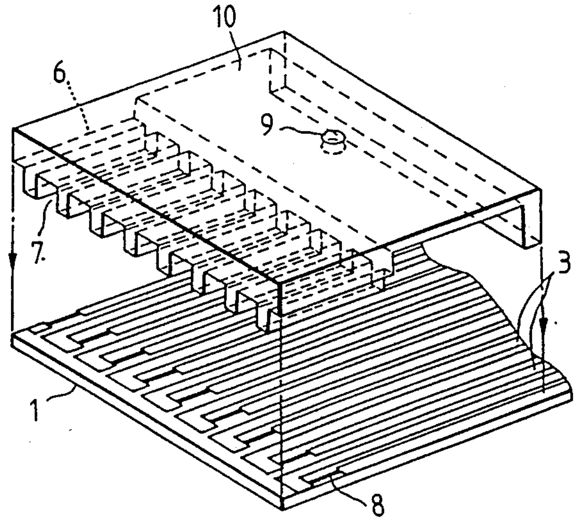
Figure 2:
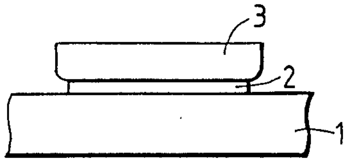
FIG. 2 PRIOR ART
FIG. 2 is a partial sectional view showing the state of over-etching in the method of the prior art.
Figure 3A:
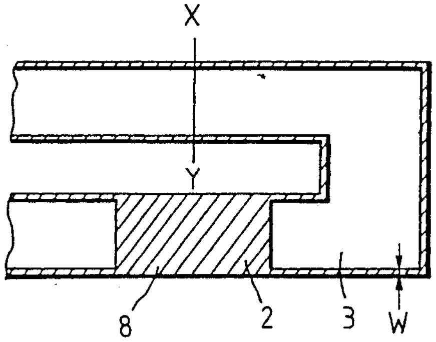
FIG. 3A PRIOR ART
FIGS. 3A and 3B are diagrammatic views showing the relationship between the electrode and the heat-generating resistor in the prior art, FIG. 3A being a plan view of the substrate and FIG. 3B being a sectional view at the line X-Y in FIG. 3A.
Figure 3B:
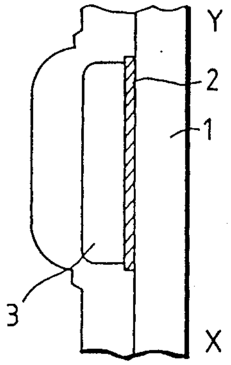
FIG. 3B PRIOR ART

The substrate obtained can be bonded to, for example, a covering member as shown in FIG. 1B to form a recording head.

The present invention is described in more detail below by referring to Examples.

EXAMPLE 1

First, on a silicon wafer (A4 size) as the support having a $SiO_2$ film (5 μm) formed on its surface by heat oxidation, $HfB_2$ was laminated with a layer thickness of 2000 Å as the heat-generating resistor layer by RF Magnetron sputtering, and further Al was laminated with a thickness of 5000 Å as the electrode layer by the EB vapor deposition method.

Next, an etching resist comprising OFPR 800 (produced by Tokyo Oka) was formed on the obtained electrode layer by the photolithographic technique.

By use of the resist thus formed as the mask, first the Al layer was etched with a phosphoric acid-nitric acid type etchant.

Next, the heat-generating resistor layer was etched with the use of RIE using $CCl_4$ as the reactive gas under the conditions of a gas pressure of 3 Pa, a power of 300 W and an etching speed of 300 Å/min.

In the etching operations, no peeling of resist or defective etching was recognized. Further, as the result of SEM observation after etching, the product had a good sectional shape without large over-etching or side etching of the electrode layer.

Next, the resist was peeled off, and further for the purpose of having a heat-generating resistor exposed at the predetermined portion, a resist (OFPR 800, produced by Tokyo Oka) film was formed at the portion except for the portion corresponding to the portion to be exposed, and this was treated with a phosphoric acid-nitric acid type etchant for Al to etch Al where no resist was provided to complete formation of an electrothermal transducer having a heat-generating portion of heat-generating resistor provided between a pair of electrodes on the support. The arrangement pitch of the heat-generating resistor was 70 μm, and the uniformity of its dimension over the whole formation surface was examined to be good. Finally, on the electrothermal transducer was provided a $SiO_2$ layer as the protective layer and further the polyimide layer at the portion except for the heat-generating portion to complete the substrate for an ink jet head.

The substrate thus prepared was bonded to a covering member 5 made of glass having a recession for forming the liquid path 6 and the liquid chamber 10, etc. as shown in FIG. 1B to prepare an ink jet recording head, and a recording test therefor was performed. As the result, good recording could be practiced, with durability being also good.

EXAMPLE 2

A substrate for an ink jet head and an ink jet head using the substrate were prepared according to the present invention in the same manner as in Example 1 except for employing $BCl_3$ as the reactive gas for etching. Etching speed was 120 Å/min.

Also in this example, a substrate for an ink jet head and an ink jet head using the substrate were prepared with high precision and high quality.

EXAMPLE 3

A substrate for an ink jet head and an ink jet head using the substrate were prepared according to the present invention in the same manner as in Example 1 except for employing $BCl_3+Cl_2$ (flow rate ratio 1:1) as the reactive gas for etching. Etching speed was 260 Å/min.

Also in this example, a substrate for an ink jet head and an ink jet head using the substrate were prepared with high precision and high quality.

EXAMPLE 4

A substrate for an ink jet head and an ink jet head using the substrate were prepared according to the present invention in the same manner as in Example 1 except for employing $CF_4$ as the reactive gas for etching. Etching speed was 31 ÅA/min Also in this example, a substrate for an ink jet head and an ink jet head using the substrate were prepared with high precision and high quality.

EXAMPLE 5

A substrate for an ink jet head and an ink jet head using the substrate were prepared according to the present invention in the same manner as in Example 1 except for employing $C_2F_6$ as the reactive gas for etching. Etching speed was 32 Å/min.

Also in this example, a substrate for an ink jet head and an ink jet head using the substrate were prepared with high precision and high quality.

EXAMPLE 6

A substrate for an ink jet head and an ink jet head using the substrate were prepared according to the present invention in the same manner as in Example 1 except for employing $CHF_3$ as the reactive gas for etching. Etching speed was 21 Å/min.

Also in this example, a substrate for ink jet head and an ink jet head using the substrate were prepared with high precision and high quality.

EXAMPLE 7

A substrate for an ink jet head and an ink jet head using the same were prepared according to the present invention in the same manner as in Example 1 except for employing $ZrB_2$ as the material for forming a heat-generating resistor. Etching speed was 320 Å/min.

Also in this example, a substrate for an ink jet head and an ink jet head using the substrate were prepared with high precision and high quality.

EXAMPLE 8

A substrate for an ink jet head and an ink jet head using the same were prepared according to the present invention in the same manner as in Example 1 except for employing $ZrB_2$ as the material for forming a heat-generating resistor and employing $CF_4$ as the reactive gas for etching. Etching speed was 31 /min.

Also in this example, a substrate for an ink jet head and an ink jet head using the substrate were prepared with high precision and high quality.

EXAMPLE 9

A substrate for an ink jet head and an ink jet head using the same were prepared according to the present invention in the same manner as in Example 1 except for employing $TiB_4$ as the material for forming a heat-generating resistor. Etching speed was 290 Å/min.

Also in this example, a substrate for an ink jet head and an ink jet head using the substrate were prepared with high precision and high quality.

EXAMPLE 10

A substrate for an ink jet head and an ink jet head using the same were prepared according to the present invention in the same manner as in Example 1 except for employing $TiB_4$ as the material for forming a heat-generating resistor and employing $CF_4$ as the reactive gas for etching. Etching speed was 27 Å/min.

Also in this example, a substrate for an ink jet head and an ink jet head using the substrate were prepared with high precision and high quality.

In the present invention, the liquid path of the ink jet head may be formed by initially forming the wall-forming member of the liquid path with a photosensitive resin and then bonding the top plate to the wall-forming member.

In an ink jet head obtained according to the present invention, the direction of ink supply to the heat generating portion within the liquid path and the direction of ink discharge from the discharge opening may be substantially the same or different from each other (for example, forming generally a right angle).

Further, the ink jet head obtained according to the present invention may be of the so-called full line type having discharge openings arranged over the whole recording width of a recording medium.

Figure 5:
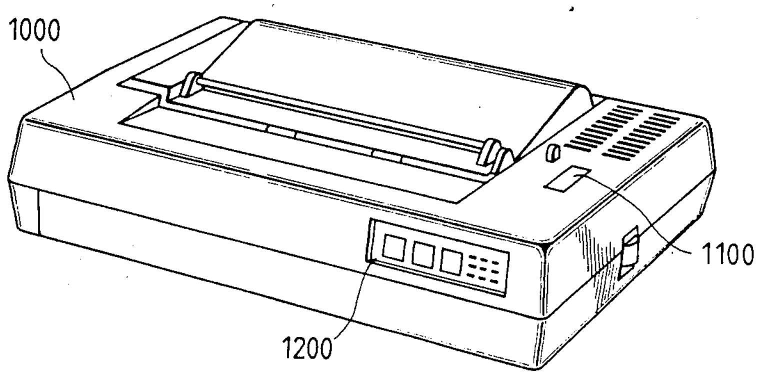
FIG. 5 is a schematic perspective view showing the appearance of an ink jet device equipped with an ink jet head obtained according to the present invention.

FIG. 5 is a schematic perspective view showing the appearance of an ink jet device equipped with an ink jet head obtained according to the present invention. There are shown a main body 1000, a power switch 1100 and an operation panel 1200.

According to the method of the present invention, since the dry etching method which can control easily the state of etching is used for patterning of the heat-generating resistor layer, no registration working of the mask as in the prior art is required and there is no lowering in yield due to registration mistake of the mask.

Also, since etching of the heat-generating resistor layer is effected in the dry step, there is no generation of defective etching in the wet step as in the prior art.

Further, even with, for example, A4 size width (210 mm) silicon wafer, a substrate with excellent dimensional precision can be provided.

What is claimed is:

1. A method of preparing an ink jet head comprising a support; an electrothermal transducer formed on said support and having a heat-generating resistor and a pair of electrodes connected electrically to said heat-generating resistor; and a liquid path formed on said support corresponding to the heat-generating portion of said electrothermal transducer formed between said pair of electrodes, and communicating with a discharge opening for discharging liquid, which comprises the step of dry etching to pattern the material for said heat-generating resistor provided on said support in the form of a layer.

2. The method as defined in claim 1, wherein said dry etching is carried out using a halogenic etching gas.

3. The method as defined in claim 2, wherein said halogenic etching gas is a chlorine-type gas.

4. The method as defined in claim 3, wherein said chlorine-type gas is selected from $CCl_4$, $Cl_2$, $BCl_3$ and $SiCl_4$.

5. The method as defined in claim 2, wherein said halogenic gas is a fluorine-type gas.

6. The method as defined in claim 5, wherein said fluorine-type gas is selected from $CF_4$, $CHF_3$ $CF_6$ and $NF_3$.

7. The method as defined in claim 1, wherein said heat-generating resistor is formed using a metal boride.

8. The method as defined in claim 7, wherein said metal boride is selected from hafnium boride, lanthanum boride, zirconium boride, titanium boride, tantalum boride, tungsten boride, molybdenum boride, niobium boride, chromium boride and vanadium boride.

9. The method as defined in claim 1, wherein prior to said step, the additional step of patterning the material for said electrodes provided on said material for said heat-generating resistor in the form of a layer is performed.

10. The method as defined in claim 9, wherein said patterning is performed by etching.

11. The method as defined in claim 10, wherein said etching is dry etching.

12. The method as defined in claim 10, wherein said etching is wet etching.

13. The method as defined in claim 1, wherein subsequently to said step, the additional step of forming a protective layer on said electrothermal transducer is performed.

14. The method as defined in claim 13, wherein said protective layer is formed using $SiO_2$.

15. The method as defined in claim 13, wherein said protective layer is formed using a polyimide.

16. The method as defined in claim 1, wherein said electrothermal transducer generates heat utilized for discharging liquid.

17. The method as defined in claim 1, wherein said liquid path is formed by bonding said support to a covering member having a recession for forming the liquid path.

18. The method as defined in claim 1, wherein said liquid path is formed by forming a wall-forming member for forming the wall of the liquid path and then bonding said wall-forming member to a top plate.

19. The method as defined in claim 18, wherein said wall-forming member is formed using a photosensitive resin.

20. A method of preparing a substrate for an ink jet head comprising a support; and an electrothermal transducer formed on said support and having a heat-generating resistor and a pair of electrodes connected electrically to said heat-generating resistor, which comprises the step of dry etching to pattern the material for said heat-generating resistor provided on said support in the form of a layer.

21. The method as defined in claim 20, wherein said dry etching is carried out using a halogenic etching gas.

22. The method as defined in claim 21, wherein said halogenic etching gas is a chlorine-type gas.

23. The method as defined in claim 22, wherein said chlorine-type gas is selected from $CCl_4$, $Cl_2$, $BCl_3$ and $SiCl_4$.

24. The method as defined in claim 21, wherein said halogenic gas is a fluorine-type gas.

25. The method as defined in claim 24, wherein said fluorine-type gas is selected from $CF_4$, $CHF_3$, $C_2F_6$ and $NF_3$.

26. The method as defined in claim 20, wherein said heat-generating resistor is formed using a metal boride.

27. The method as defined in claim 26, wherein said metal boride is selected from hafnium boride, lanthanum boride, zirconium boride, titanium boride, tantalum boride, tungsten boride, molybdenum boride, niobium boride, chromium boride and vanadium boride.

28. The method as defined in claim 20, wherein prior to said step, the additional step of patterning the material for said electrodes provided on said material for said heat-generating resistor in the form of a layer is performed.

29. The method as defined in claim 28, wherein said patterning is performed by etching.

30. The method as defined in claim 29, wherein said etching is dry etching.

31. The method as defined in claim 29, wherein said etching is wet etching.

32. The method as defined in claim 20, wherein subsequently to said step, the additional step of forming a protective layer on said electrothermal transducer is performed.

33. The method as defined in claim 32, wherein said protective layer is formed using $SiO_2$.

34. The method as defined in claim 32, wherein said protective layer is formed using a polyimide.

* * * * *

UNITED STATES PATENT AND TRADEMARK OFFICE
CERTIFICATE OF CORRECTION

PATENT NO. : 4,889,587

DATED : December 26, 1989

INVENTOR(S) : HIROKAZU KOMURO

It is certified that error appears in the above-identified patent and that said Letters Patent is hereby corrected as shown below:

ON THE TITLE PAGE,

AT [56] REFERENCES CITED

Foreign Patent Documents, "194859 5/1984 Japan" should read --194859 11/1984 Japan--.

COLUMN 1

Line 45, "having" should read --has--.

COLUMN 5

Line 47, "31 ÅA/min" should read --31 Å/min.--.

COLUMN 6

Line 1, "for ink" should read --for an ink--.
Line 21, "31 /min" should read --31 Å/min.--.

COLUMN 7

Line 7, "example, A4" should read --example, an A4--.
Line 33, "$CHF_3$ $CF_6$" should read --$CHF_3$, $C_2F_6$--.

UNITED STATES PATENT AND TRADEMARK OFFICE

CERTIFICATE OF CORRECTION

PATENT NO. : 4,889,587

DATED : December 26, 1989

INVENTOR(S) : HIROKAZU KOMURO

It is certified that error appears in the above-identified patent and that said Letters Patent is hereby corrected as shown below:

COLUMN 8

Line 5, "formed by" should read --formed after said step of dry etching by--.
Line 9, "formed by" should read --formed after said step of dry etching by--.

Signed and Sealed this

Fifth Day of January, 1993

Attest:

DOUGLAS B. COMER

*Attesting Officer*

*Acting Commissioner of Patents and Trademarks*